United States Patent
Chiou et al.

(10) Patent No.: US 9,801,023 B2
(45) Date of Patent: Oct. 24, 2017

(54) WIRELESS COMMUNICATIONS DEVICES AND RELATED METHODS FOR PERFORMING POSITIONING MEASUREMENTS IN A SERVICE NETWORK

(71) Applicant: MediaTek Inc., Hsin-Chu (TW)

(72) Inventors: Tsung-Yu Chiou, Zhudong Township, Hsinchu County (TW); Yuan-Wen Ting, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/551,287

(22) Filed: Nov. 24, 2014

(65) Prior Publication Data

US 2016/0150376 A1    May 26, 2016

(51) Int. Cl.
*H04W 4/02* (2009.01)

(52) U.S. Cl.
CPC .................................. *H04W 4/025* (2013.01)

(58) Field of Classification Search
CPC ....... H04W 64/00; G01S 5/0257; G01S 19/48
USPC ........................................... 455/456.1, 456.2
See application file for complete search history.

(56) References Cited

U.S. PATENT DOCUMENTS

| | | | |
|---|---|---|---|
| 2012/0040685 A1* | 2/2012 | Escolar-Piedras .... | G01S 5/0221 455/456.1 |
| 2012/0088518 A1* | 4/2012 | Edge ..................... | H04W 64/00 455/456.1 |
| 2015/0215955 A1* | 7/2015 | Das ....................... | H04W 64/00 370/329 |

* cited by examiner

*Primary Examiner* — Thomas Lett
(74) *Attorney, Agent, or Firm* — McClure, Qualey & Rodack, LLP

(57) ABSTRACT

A wireless communications device with a wireless module, a storage unit and a controller module is provided for performing positioning measurements. The wireless module receives a plurality of positioning signals from a service network during respective position occasions. The controller module processes the received signals and performs measurements on the processed signals, wherein measurement result is taken at least three processed signals with respective position occasions, wherein each measurement result is stored in the storage unit with the information of corresponding base station and respective position occasion, wherein performing the measurements further include combining the stored measurement results for all of position occasions for generating a final measurement report.

22 Claims, 3 Drawing Sheets

WIRELESS COMMUNICATIONS DEVICES AND RELATED METHODS FOR PERFORMING POSITIONING MEASUREMENTS IN A SERVICE NETWORK

BACKGROUND OF THE INVENTION

Field of the Invention

The invention generally relates to wireless communications, and more particularly, to wireless communications devices and related methods for performing positioning measurements in a service network.

Description of the Related Art

In a typical mobile communications environment, user equipment (UE) may communicate voice and/or data signals with one or more service networks via cellular stations of the service networks. The wireless communications between the UE and the service networks may be in compliance with various radio access technologies (RATs), such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, Universal Mobile Telecommunications System (UMTS) technology and others.

In recent years, there is a growing need for a positioning method to determine the position of a UE for a variety of applications. A Global Positioning System (GPS) based scheme and a terrestrial positioning based scheme are widely known as positioning methods of the UE. The GPS based scheme measures the position of the UE using satellites. However, the GPS based scheme needs to receive signals from at least 4 satellites and cannot be used indoors. Meanwhile, the terrestrial positioning based scheme measures the position of the UE location by using a timing difference between signals received from base stations (BSs) and needs to receive signals from a number of base stations. The terrestrial positioning based scheme estimates the position of the UE mainly using a synchronization signal or a reference signal. Observed Time Difference Of Arrival (OT-DOA) is one common positioning technology for such terrestrial positioning based scheme, in which a UE measures the reference signal time differences (RSTDs) between positioning reference signals (PRSs) sent by three or more different base stations or cells to obtain the differences between distances from different base stations to the terminal, so as to achieve the purpose of positioning.

However, a plurality of base stations or cells can participate in determining the position of a UE. In actual implementation, a plurality of stations or cells may periodically transmit positioning signals to a UE during a plurality of respective position occasions and the UE may then estimate and determine a measurement result for each base station based on the received positioning signals. Currently, although multiple positioning signals may be received from each base station during a plurality of position occasions for the UE, only a portion of the received positioning signals or a portion of positioning signals which are received during a portion of the position occasions may be applied to obtain the measurement results for the bases stations, thus making the measurements become incorrect and unreliable.

BRIEF SUMMARY OF THE INVENTION

Wireless communications devices and related methods for performing positioning measurements are provided.

In one aspect of the invention, a wireless communications device with a wireless module, a storage unit and a controller module is provided for performing positioning measurements. The wireless module receives a plurality of positioning signals from a service network during respective position occasions. The controller module processes the received signals and performs measurements on the processed signals, wherein measurement result is taken at least three processed signals with respective position occasions, wherein each measurement result is stored in the storage unit with the information of corresponding base station and respective position occasion, wherein performing the measurements further include combining the stored measurement results for all of position occasions for generating a final measurement report.

In another aspect of the invention, a method for use in a wireless communications device for performing positioning measurements in a service network is provided. The service network comprises a plurality of base stations. First, a plurality of positioning signals are received from the base stations during respective position occasions. The received signals are then processed and measurements are performed on the processed signals, wherein measurement result is taken at least three processed signals with respective position occasions, wherein each measurement result is stored in the storage unit with the information of corresponding base station and respective position occasion, wherein performing the measurements further include combining the stored measurement results for all of position occasions for generating a final measurement report.

Other aspects and features of the present invention will become apparent to those with ordinarily skill in the art upon review of the following descriptions of specific embodiments of method for use in a wireless communications device for performing positioning measurements in a service network.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense.

Figure 1:
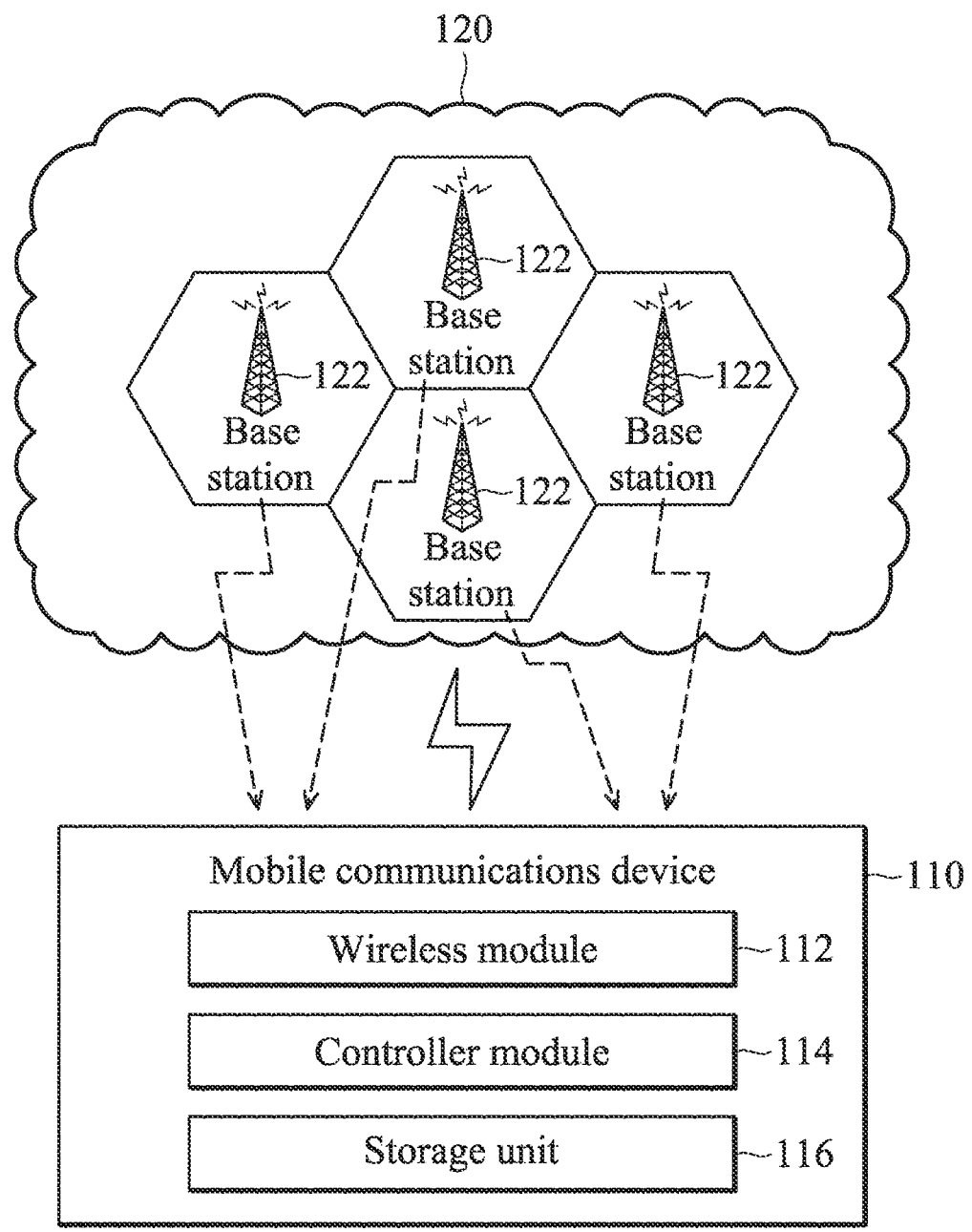
FIG. 1 is a block diagram illustrating a block diagram illustrating a mobile communications environment according to an embodiment of the invention.

FIG. 1 is a block diagram illustrating a mobile communications environment according to an embodiment of the invention. In the mobile communications environment, the wireless communications device 110 is wirelessly connected to a plurality of base stations 122 of the service network 120 for obtaining wireless services. Generally, each of the base stations 122 may be referred to as a base station, a cell or an access station, or may be referred to as an Home Node-B (HNB) in a WCDMA network or a Home e-Node-B (HeNB) in an LTE network, which is controlled by a control node (not shown) to provide the functionality of wireless transceiving for the service network 120. In this embodiment, the base station 122 can be an LTE cellular station (or called an LTE cell) which supports the LTE technology, but it is not limited thereto. The wireless communications device 110 is referred to as a user equipment (UE) or a mobile station (MS), supporting the abovementioned RATs, and can be a device such as a mobile phone, a computer system, etc. The wireless communications device 110 comprises a wireless module 112 for performing the functionality of wireless transmission and reception to and from the base stations 122. To further clarify, the wireless module 112 may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 900 MHz, 1900 MHz, or 2100 MHz utilized in WCDMA systems, or may be 900 MHz, 2100 MHz, or 2.6 GHz utilized in LTE systems, or others depending on the radio access technology (RAT) in use. Also, the wireless communications device 110 further comprises a controller module 114 for controlling the operation of the wireless module 112 and other functional components, such as a display unit and/or keypad serving as the MMI (man-machine interface), a storage unit 116 storing the program codes of applications or communication protocols, or others. The storage unit 116 may further store related data needed for positioning measurements, such as temporality measurement results in each position occasion and a final measurement report for each of the base stations 122. In one embodiment, the service network 120 may be a WCDMA network and the wireless communications device 110 may be a UE in compliance with related specifications of the WCDMA technology. In another embodiment, the service network 130 may be an LTE network and the wireless communications device 110 may be a UE in compliance with the 3GPP specification and other related specifications of the LTE technology, and the invention is not limited thereto.

Each of the base stations 122 transmits positioning signals during respective position occasions of those base stations periodically. A positioning signal as used herein is specifically designed (e.g., with good signal quality) to be a signal on which a UE (e.g. the wireless communications device 110) performs positioning measurements. A position occasion of a base station 122 used herein can be referred as a periodic interval of time during which that base station 122 transmits a positioning signal for measurement by the wireless communications device 110. Such measurements are to be used by the wireless communications device 110 itself, or some other network node (not shown) in the core network (e.g., a positioning node), for determining the geographic position of the wireless communications device 110. In some embodiments, for example, such positioning measurements comprise timing measurements. In such a case, the wireless communications device 110 may measure timing differences (e.g. the RSTD) between different positioning signals received from different base stations 122. These timing differences may then be used to estimate the position of the wireless communications device 110 with respect to the different base stations 122. It should be understood that, one of the base stations (e.g. the serving base station) may serve as a so-called reference base station or cell for the wireless communications device 110's measurements. Positioning measurements performed with respect to this reference base station, serves as a reference for measurements performed with respect to other base stations. For example, when the positioning measurements are timing measurements, the wireless communications device 110 may measure the difference between the time at which it receives a positioning signal from the reference base station and the time at which it receives a positioning signal from another base station. It is to be understood that, a Positioning Reference Signal (PRS) transmission may have multiple position occasions. For example, in one embodiment, the PRS signal transmission may comprise at least three position occasions. That is, each base station will transmit positioning signals to the wireless communications device 110 at least three times in this PRS signal transmission.

To be more specific, the controller module 114 controls the wireless module 112 for performing a positioning measurement and reporting procedure with the service network 120 via one of the base stations 122 (also referred to as a serving base station), which will be described further in the following paragraphs.

Figure 2:
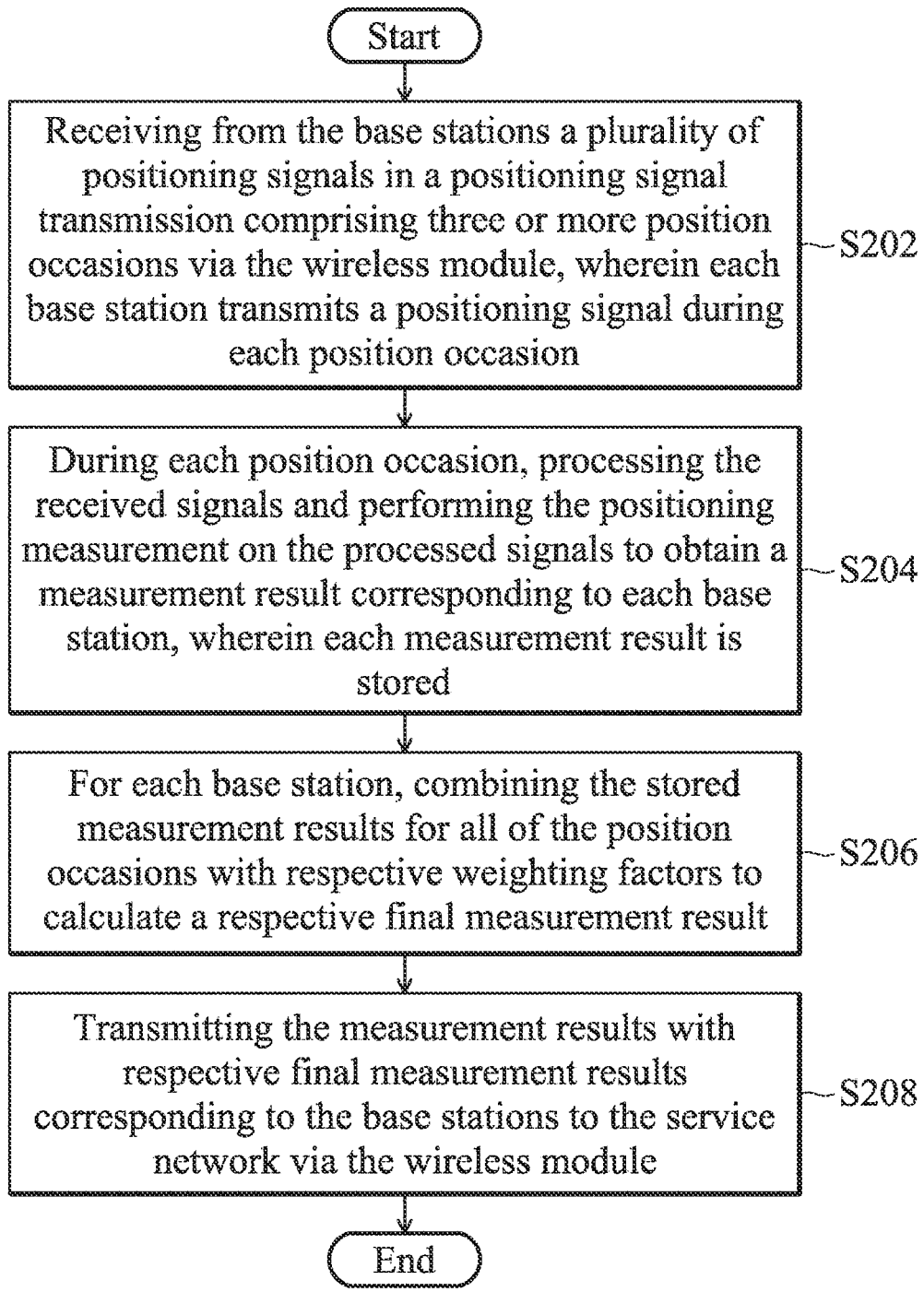
FIG. 2 is a flow chart illustrating a method for use in a wireless communications device for performing positioning measurements in a service network according to an embodiment of the invention.

FIG. 2 is a flow chart illustrating a method for use in a wireless communications device for performing positioning measurements in a service network according to an embodiment of the invention. The method can be applied to the wireless communications device 110 as shown in FIG. 1. In this embodiment, the service network 120 comprises a plurality of base stations 122 that transmit positioning signals during respective position occasions of the base stations periodically. In one embodiment, a PRS signal transmission may comprise at least three position occasions. That is, each base station will transmit positioning signals to the wireless communications device 110 at least three times in this PRS signal transmission. In each position occasion, there are at least 1 subframe and up to 6 subframes, wherein the maximum number of position occasions, N, is 16.

First, in step S202, the controller module 114 receives a plurality of positioning signals transmitted in a positioning signal transmission comprising at least three position occasions from the base stations 122 via the wireless module 112. Note that each base station 122 transmits positioning signals during each of the respective position occasions periodically. After receiving the positioning signals from the base stations 122, in step S204, the controller module 114 processes the received signals and performs the positioning measurements on the processed signals to obtain a measurement result corresponding to each base station 122 and then stores the measurement result corresponding to each base station 122. In this embodiment, the measurement result is taken at least three processed signals with respective position occasions and each measurement result is stored in the storage unit 116 with the information of corresponding base station 122 and respective position occasion. For example, if there are three base stations BS1, BS2 and BS3 and three position occasions occasion1, occasion2 and occasion3 present, the controller module 114 may process the positioning signals which are received from the BS1, BS2 and BS3 and perform the positioning measurements on the processed signals for the BS1, BS2 and BS3 to obtain three measurement results corresponding to the BS1, BS2 and BS3, respectively during each of the occasion1, occasion2 and occasion3.

Thereafter, in step S206, the controller module 114 performs a combining step to combine the stored measurement results for all of the position occasions with respective weighting values to calculate a final measurement report for each base station 122. It is to be understood that each stored measurement result may have a respective weighting value. The combining step can be performed on reference signal time difference (RSTD), time of arrival (TOA) or Non-coherent results of the received signals. The positioning measurements may at least comprise RSTD for Time Difference of Arrival (TDOA) positioning, but the invention is not limited thereto. In one embodiment, the controller module 114 may combine the stored measurement results for all of the position occasions with respective weighting values to calculate the final measurement report for each base station by multiplying each of the stored measurement results with respective weighting value and summing up all of the multiplied results to obtain the final measurement report for each base station 122.

For example, if it is assumed that a difference between different occasions with respect to i is denoted as dk. RSTDn(i) indicates the RSTD between the base station i and the reference base station during position occasion n, where the RSTD1(i) is served as the reference measurement result:

$d1 = RSTD2(i) - RSTD1(i),$ $d2 = RSTD3(i) - RSTD1(i),$

. . .

$dn-1 = RSTDn(i) - RSTD1(i)$ for each i.

If d1, d2, . . . dn−1 are close to zero mean, it indicates the UE is static. Thus, the final RSTD $RSTDi_{final}$ for each i can be calculated by the following equation:

$RSTDi_{final} = w1*RSTD1(i) + w2*RSTD2(i) + w3*RSTD3(i) + \ldots + wn*RSTDn(i),$ wherein w1, w2, w3, . . . , wn are the weighting values which can be determined based on an averaged signal-to-noise ratio (SNR) of the received signals which are measured during each of the position occasions, for example.

After the final measurement reports for all of the base stations 122 have been calculated, in step S208, the controller module 114 transmits the final measurement reports which correspond to the base stations 122 to the service network via the wireless module 112. Upon receiving the measurement report transmitted by the wireless communications device 110, the position of the wireless communications device 110 can be determined based on the final measurement reports (e.g. the RSTDs) for the base stations 122.

For explanation, several specific embodiments are illustrated in the following to explain the detailed process of determining the respective weighting values of the stored measurement results and providing combining methods to combine the stored measurement results for all of the position occasions with respective weighting values to calculate the final measurement report for each base station by the controller module of the invention, and those skilled in the art will understand that these specific embodiments are used for explanation only and the invention is not limited thereto.

In some embodiments, the combining step can be performed by using an equal gain combining (EGC) manner, wherein relative gain of each position occasion is the same. To be more specific, prior to combining the stored measurement results, the controller module 114 may further configure all of the weighting values of the stored measurement results to be the same value. For example, if the measurement results in each position occasion relative to a base station i are 1, 3, 2, 5 and 4 respectively, the final measurement report $RSTD_{Final}$ for this base station i can be set to be $RSTD_{Final} = (1*1 + 1*3 + 1*2 + 1*5 + 1*4)/5 = 3$ if applying the EGC manner for combining, wherein all of the weighting values of the stored measurement results are configured to be 1.

In some embodiments, the combining step can be performed by using an EGC with sort and cut (EGC-SC) manner, wherein the smallest and the largest RSTDs are removed prior to performing the aforementioned EGC.

Figure 3:
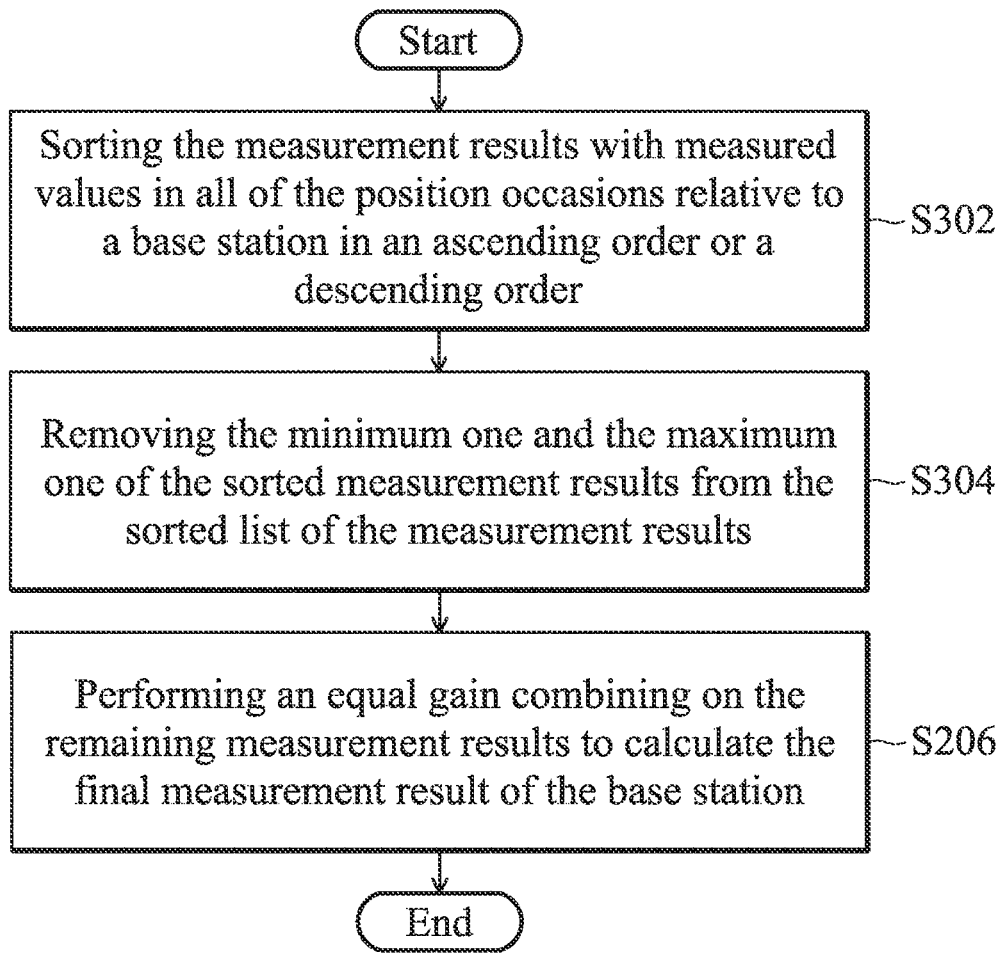
FIG. 3 is a flow chart illustrating a method for use in a wireless communications device for performing positioning measurements in a service network according to an embodiment of the invention.

FIG. 3 is a flow chart illustrating a method for use in a wireless communications device for determining a final measurement report of a base station based on the measurement results according to an embodiment of the invention. The method can be applied to the wireless communications device 100 as shown in FIG. 1.

First, the controller module 114 sorts the measurement results with measured values in all of the position occasions relative to a base station 122 in an ascending order or a descending order (step S302). The measurement results in all of the position occasions relative to a base station i are first sorted to arrange them in an ascending order or a descending order.

Then, the controller module 114 removes the minimum one and the maximum one of the sorted measurement results from the sorted list of the measurement results (step S304). In this step, the controller module 114 may remove the measurements with the smallest and largest values from the sorted measurement results. In this step, the weighting values for the minimum one and the maximum one of the sorted measurement results are set to be 0 and remaining sorted measurement results other than the minimum one and the maximum one of the sorted measurement results are set to be 1.

After removing the minimum one and the maximum one from the sorted measurement results, the control module 114 further performs an EGC on the remaining measurement results to calculate the final measurement report for the base station (step S306). For example, if the measurement results in each position occasion relative to a base station i are 1, 3, 2, 5 and 4 respectively, the measurement results are first sorted to become 1, 2, 3, 4 and 5. Then, the measurement results with value of 1 (i.e. the minimum one) and 5 (the maximum one) will be removed as these two are the smallest and largest measurement results among others. After removing the minimum one and the maximum one from the sorted measurement results, the remaining measurement results are 2, 3 and 4. To be more specific, the weighting value of each of the remaining measurement results is set be 1. Thus, the final measurement report $RSTD_{Final}$ for this base station i can be obtained as $RSTD_{Final} = (1*2 + 1*3 + 1*4)/3 = 3$.

In some embodiments, prior to performing the EGC, the sort and cut operation can be performed based on a minimum threshold and a maximum threshold. Note that values of the minimum threshold and the maximum threshold can be predefined based on user requirement or be determined dynamically in the runtime, for example, based on the signal qualities of positioning signals. For example, in one embodiment, the sorted measurement results with values lager than the maximum threshold or smaller than the minimum threshold can be removed from the sorted list of the measurement results and then the EGC is further applied on the remaining measurement results for combining. For example, in previously example, if the minimum threshold and the maximum threshold are set to be 2 and 3 respectively, the measurement results with values of 1, 4 and 5 will be removed prior to performing the EGC.

In some embodiments, the combining step can be performed by sorting the measurement results and picking the median among them as the final measurement report. In these embodiments, prior to combining the stored measurement results, the controller module may first sort the stored measurement results in an ascending order, then configure the weighting values of the sorted measurement results other than the median one of the sorted measurement results to be 0 and then configure the weighting value of the median one of the sorted measurement results to be 1. For example, if the measurement results in each position occasion relative to a base station i are 1, 3, 2, 5 and 4 respectively, the measurement results are first sorted to become 1, 2, 3, 4 and 5. In this case, the median one of the sorted measurement results is the measurement result with a value of 3, which will then be picked up as the final measurement report. That is, the weighting value of each of the measurement results other than the median one is set to be 0. Thus, the final measurement report $RSTD_{Final}$ for this base station i can be set to be $RSTD_{Final}=3$.

In some embodiments, the combining step can be performed by calculating the difference for each occasion pair, finding the pair with the minimum distance to be the candidate pair and averaging the two RSTDs of that pair to obtain the final measurement. In these embodiments, the controller module may further combine the stored measurement results for all of the position occasions with respective weighting values to calculate the final measurement report for each base station by grouping the measurement results for each two of the position occasions into a number of pairs, calculating a difference between the two measurement results for each pair, selecting a pair with the minimum distance among the pairs, averaging the measurement results of the selected pair and determining the averaged result to be the final measurement report. For example, if there are 3 occasions available, the difference for each pair is calculated. In this case, assume that there are a first RSTD estimation RSTD(1) for position occasion 1, a second RSTD estimation RSTD(2) for position occasion 2 and a third RSTD estimation RSTD(3) for position occasion 3. A difference between the pair (occasion i, occasion j) is denoted as dij=RSTD(j)−RSTD(i). It is then compared and found a pair with minimum distance. Then, an average of these two RSTDs is calculated and the average of the two RSTDs is to be reported as the final RSTD measurement result.

In some embodiments, the combining step can be performed by SNR weighted combining with sort and cut manner. In these embodiments, the minimum and the maximum RSTDs are removed prior to performing SNR weighted combining. For example, if the measurement results in each occasion relative to a base station i are 1, 3, 2, 5 and 4 and their weighting values are 1, 0.5, 0.2, 0.3, 0.8 respectively, the final measurement report RSTDFinal for this base station i can be set to be RSTDFinal=(1*1+0.5*3+0.2*2+0.3*5+0.8*4)/5=1.52. In another embodiment, the measurement results in all of the occasions relative to a base station i are first sorted to arrange them in an ascending order or descending order, then the minimum one and the maximum one of the sorted measurement results are removed from the sorted list of the measurement results and then the EGC is further applied on the remaining measurement results for combining, so as to obtain the final measurement report for each base station. To be more specific, the weighting values for the minimum one and the maximum one of the sorted measurement results are set to be 0 and remaining sorted measurement results other than the minimum one and the maximum one of the sorted measurement results are set to be the same value (e.g. 1). For example, if the measurement results in each position occasion relative to a base station i are 1, 3, 2, 5 and 4 respectively, the measurement results are first sorted to become 1, 2, 3, 4 and 5. Then, the measurement results with value of 1 (i.e. the minimum one) and 5 (the maximum one) will be removed as these two are smallest and largest measurement results among others. After removing the minimum one and the maximum one from the sorted measurement results, the remaining measurement results are 2, 3, 4. The weighting values of the remaining measurement results can be set as 0.8, 1 and 0.6 respectively. Thus, the final measurement report RSTDFinal for this base station i can be set to be RSTDFinal=(0.8*2+1*3+4*0.9)/3=2.73.

In some embodiments, the combining step can be performed by weighted combining with a confidence lookup table (not shown). In the confidence lookup table, different ranges of values of the measurement results are provided with a number of levels and the weighting value of each measurement result can be obtained by performing a table lookup operation on the confidence lookup table using its measured value. For example, the measurement result with a value of 3 and the measurement result with a value of 4 can have the same weighting value "1" according to the confidence lookup table.

In summary, according to the wireless communications devices for performing positioning measurements and methods for use in a wireless communications device for performing positioning measurements in a service network of the invention, positioning signals that are transmitted by multiple base stations during multiple respective position occasions of the base stations periodically can be all utilized by the wireless communications device to determine the measurement result for each base station using a number of weight combining methods for positioning measurements to determine a position of the wireless communications device, thereby enhancing the accuracy and reliability of the PRS-related (e.g. RSTD) measurements.

Methods for use in a wireless communications device for performing positioning measurements in a service network and systems thereof, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A wireless communications device for performing positioning measurements, comprising:
   a wireless module for receiving a plurality of positioning signals from each of a plurality of base stations in a service network during a plurality of position occasions, wherein each position occasion is a periodic interval of time, wherein the plurality of positioning signals include at least 3 positioning signals and respective positioning signals are received from respective position occasions;
   a storage unit; and
   a controller module for processing the received signals and performing measurements on the processed signals to obtain measurement results; and generating a measurement report according to the measurement results,
   wherein each measurement result is stored in the storage unit with the information of corresponding base station and respective position occasion,
   wherein the measurement report is generated by combining the stored measurement results for all of the position occasions,
   wherein the controller module further combines the stored measurement results for all of the position occasions with respective weighting values for generating the measurement report.

2. The wireless communications device of claim 1, wherein prior to combining the stored measurement results, the controller module further configures all of the weighting values of the stored measurement results to be the same value.

3. The wireless communications device of claim 1, wherein prior to combining the stored measurement results, the controller module further sorts the stored measurement results in an ascending order, configures the weighting values of the maximum one and the minimum one of the sorted measurement results to be 0 and configures the weighting values of remaining sorted measurement results to be the same value.

4. The wireless communications device of claim 1, wherein prior to combining the stored measurement results, the controller module further sorts the stored measurement results in an ascending order, configures the weighting values of the sorted measurement results other than the median one of the sorted measurement results to be 0 and configures the weighting value of the median one of the sorted measurement results to be 1.

5. The wireless communications device of claim 1, wherein the controller module further combines the stored measurement results for all of the position occasions with respective weighting values by grouping the measurement results for each two of the position occasions into a number of pairs, calculating a difference between the two measurement results for each pair, selecting a pair with the minimum distance among the pairs, averaging the measurement results of the selected pair and determining the averaged result to be the measurement report.

6. The wireless communications device of claim 1, wherein the weighting values for the measurement results are determined based on an averaged signal-to-noise ratio (SNR) of the received signals which are measured during each of the position occasions.

7. The wireless communications device of claim 1, wherein the weighting values for the measurement results are determined by table lookup operation using a lookup table.

8. The wireless communications device of claim 1, wherein the controller module further performs the combining step on reference signal time difference (RSTD), time of arrival (TOA) or Non-coherent results of the received signals and the positioning measurements comprise RSTD for Time Difference of Arrival (TDOA) positioning.

9. The wireless communications device of claim 8, wherein one of the plurality of base stations is served as a reference base station, and the positioning measurements comprise RSTD between the reference base station and an another base station of the plurality of base stations.

10. The wireless communications device of claim 1, wherein the service network comprises a long term evolution (LTE) network and the positioning signals comprise Positioning Reference Signals (PRS).

11. The wireless communications device of claim 1, wherein the controller module further combines the stored measurement results for all of the position occasions with respective weighting values by multiplying each of the stored measurement results with respective weighting value and summing up all of the multiplied results to obtain the measurement report.

12. A method for use in a wireless communications device for performing positioning measurements in a service network comprising a plurality of base stations, the method comprising:
   receiving from each of the base stations a plurality of positioning signals during a plurality of position occasions, wherein each position occasion is a periodic interval of time, wherein the plurality of positioning signals include at least 3 positioning signals and respective positioning signals are received from respective position occasions;
   processing the received signals and performing measurements on the processed signals to obtain measurement results; and
   generating a measurement report according to the measurement results,
   wherein each measurement result is stored in a storage unit with the information of corresponding base station and respective position occasion,
   wherein the measurement report is generated by combining the stored measurement results for all of the position occasions,
   wherein combining the stored measurement results further comprises combining the stored measurement results for all of the position occasions with respective weighting values for generating the measurement report.

13. The method of claim 12, further comprising:
   configuring all of the weighting values of the stored measurement results to be the same value prior to combining the stored measurement results.

14. The method of claim 12, wherein combining the stored measurement results further comprises:

prior to combining the stored measurement results, sorting the stored measurement results in an ascending order, configuring the weighting values of the maximum one and the minimum one of the sorted measurement results to be 0 and configuring the weighting values of remaining sorted measurement results to be the same value.

15. The method of claim 12, wherein combining the stored measurement results further comprises:

prior to combining the stored measurement results, sorting the stored measurement results in an ascending order, configuring the weighting values of the sorted measurement results other than the median one of the sorted measurement results to be 0 and configuring the weighting value of the median one of the sorted measurement results to be 1.

16. The method of claim 12, wherein combining the stored measurement results further comprises:

grouping the measurement results for each two of the position occasions into a number of pairs;

calculating a difference between the two measurement results for each pair, selecting a pair with the minimum distance among the pairs;

averaging the measurement results of the selected pair; and determining the averaged result to be the measurement report.

17. The method of claim 12, wherein the weighting values for the measurement results are determined based on an averaged signal-to-noise ratio (SNR) of the received signals which are measured during each of the position occasions.

18. The method of claim 12, wherein the weighting values for the measurement results are determined by table lookup operation using a lookup table.

19. The method of claim 12, wherein the combining step is performed by multiplying each of the stored measurement results with respective weighting value and summing up all of the multiplied results to obtain the measurement report for each base station.

20. The method of claim 12, wherein the combining step is performed on reference signal time difference (RSTD), time of arrival (TOA) or Non-coherent results of the received signals and the positioning measurements comprise RSTD for Time Difference of Arrival (TDOA) positioning.

21. The method of claim 20, wherein one of the plurality of base stations is served as a reference base station, and the positioning measurements comprise RSTD between the reference base station and an another base station of the plurality of base stations.

22. The method of claim 12, wherein the service network comprises a long term evolution (LTE) network and the positioning signals comprise Positioning Reference Signals (PRS).

* * * * *